United States Patent
Seo et al.

(10) Patent No.: US 10,162,512 B2
(45) Date of Patent: Dec. 25, 2018

(54) MOBILE TERMINAL AND METHOD FOR DETECTING A GESTURE TO CONTROL FUNCTIONS

(71) Applicant: Samsung Electronics Co., Ltd., Gyeonggi-do (KR)

(72) Inventors: Ho-Seong Seo, Gyeonggi-do (KR); Shi-Yun Cho, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 35 days.

(21) Appl. No.: 14/310,716

(22) Filed: Jun. 20, 2014

(65) Prior Publication Data

US 2014/0379341 A1 Dec. 25, 2014

(30) Foreign Application Priority Data

Jun. 20, 2013 (KR) ........................ 10-2013-0071062

(51) Int. Cl.
| | | |
|---|---|---|
| G06F 1/16 | (2006.01) | |
| G06F 1/32 | (2006.01) | |
| G06F 3/01 | (2006.01) | |
| G06F 3/16 | (2006.01) | |
| H04M 1/27 | (2006.01) | |
| H04M 1/67 | (2006.01) | |
| H04M 1/725 | (2006.01) | |
| G06F 3/0346 | (2013.01) | |

(Continued)

(52) U.S. Cl.
CPC .......... *G06F 3/04883* (2013.01); *G06F 1/163* (2013.01); *G06F 1/1694* (2013.01); *G06F 1/3231* (2013.01); *G06F 1/3262* (2013.01); *G06F 1/3265* (2013.01); *G06F 3/012* (2013.01); *G06F 3/0346* (2013.01); *G06F 3/167* (2013.01); *G10L 15/22* (2013.01); *H04M 1/72522* (2013.01); *G10L 2015/223* (2013.01); *H04M 1/271* (2013.01); *H04M 1/67* (2013.01); *H04M 2250/12* (2013.01); *H04M 2250/22* (2013.01); *H04M 2250/52* (2013.01); *H04M 2250/74* (2013.01); *Y02D 10/153* (2018.01); *Y02D 10/173* (2018.01)

(58) Field of Classification Search
None
See application file for complete search history.

(56) References Cited

U.S. PATENT DOCUMENTS 9,082,407 B1 * 7/2015 Faaborg .................. G10L 15/22
9,530,410 B1 * 12/2016 LeBeau .................. G10L 15/22
(Continued)

FOREIGN PATENT DOCUMENTS

| JP | 2000312255 A | 11/2000 |
|---|---|---|
| KR | 1020040032820 A | 4/2004 |
| KR | 1020070007329 A | 1/2007 |

*Primary Examiner* — Pierre Louis Desir
*Assistant Examiner* — Jonathan C Kim
(74) *Attorney, Agent, or Firm* — The Farrell Law Firm, P.C.

(57) ABSTRACT

The present disclosure relates to a portable terminal, and more particularly, to a portable terminal and a method of detecting a gesture and controlling a function. A method of controlling a function of a portable terminal includes: detecting a gesture; activating a voice recognition module in response to the detected gesture; and analyzing a voice input into the activated voice recognition module, and executing a function corresponding to the input voice.

13 Claims, 13 Drawing Sheets

(51) Int. Cl.
*G10L 15/22* (2006.01)
*G06F 3/0488* (2013.01)

(56) References Cited

U.S. PATENT DOCUMENTS

| | | | | |
|---|---|---|---|---|
| 2008/0082852 A1* | 4/2008 | Denpo | G06F 1/263 | 713/340 |
| 2009/0164219 A1* | 6/2009 | Yeung | G04C 3/002 | 704/258 |
| 2010/0079508 A1* | 4/2010 | Hodge | G06F 3/013 | 345/697 |
| 2010/0169097 A1* | 7/2010 | Nachman | G06F 3/038 | 704/275 |
| 2010/0235667 A1* | 9/2010 | Mucignat | G06F 1/3203 | 713/323 |
| 2012/0173244 A1 | 7/2012 | Kwak et al. | | |
| 2012/0265535 A1* | 10/2012 | Bryant-Rich | H04M 1/7255 | 704/270 |
| 2013/0315038 A1* | 11/2013 | Ferren | G06K 9/3266 | 367/197 |
| 2013/0342672 A1* | 12/2013 | Gray | G06F 3/013 | 348/78 |
| 2014/0053073 A1* | 2/2014 | Guo | G06F 9/468 | 715/736 |
| 2014/0123208 A1* | 5/2014 | Plagemann | G06F 21/629 | 726/1 |
| 2014/0283142 A1* | 9/2014 | Shepherd | G06F 3/0482 | 726/30 |
| 2015/0109191 A1* | 4/2015 | Johnson | G10L 15/22 | 345/156 |

* cited by examiner

MOBILE TERMINAL AND METHOD FOR DETECTING A GESTURE TO CONTROL FUNCTIONS

CROSS-REFERENCE TO RELATED APPLICATION

This application claims the priority under 35 U.S.C. § 119(a) to Korean Application Serial No. 10-2013-0071062, which was filed in the Korean Intellectual Property Office on Jun. 20, 2013, the entire content of which is hereby incorporated by reference.

TECHNICAL FIELD

The present disclosure relates to a portable terminal, and more particularly, to a portable terminal and a method of detecting a gesture and controlling a function.

BACKGROUND

In recent years, various services and additional functions that a portable terminal provides are gradually increasing in use. In order to increase the effective value of the portable terminal and meet various user demands of users, a variety of applications which can be executed in the portable terminal have been developed.

Accordingly, recently, at least several to several hundreds of applications may be stored in a portable terminal, such as a smart phone, a mobile hone, a notebook PC, and a tablet PC, which is portable, is attachable to a wrist and the like, and includes a touch screen, and a plurality of applications may be displayed on a touch screen of the portable terminal. Further, the portable terminal and the applications are controlled by a touch or a hovering of an input unit, such as a finger, an electronic pen, or a stylus pen.

As described above, the portable terminal providing various functions may be attached to a user's waist, an ankle, and the like, as well as the wrist. Typically, the aforementioned portable terminal is called a wearable terminal. The wearable terminal (that is, a wearable portable terminal) includes various terminals, such as smart watches, watch phones, wrist phones, and bangle phones. Further, in cases where a user desires to use a voice recognition function or other functions via the portable terminal, there is an inconvenience in that the user needs to input a command for activating a touch screen, and press a specific button several times, or execute an application in order to execute the voice recognition function. Further, in cases where a voice needs to be immediately recognized in a state where a lock is set, it is necessary to continuously monitor whether a voice is input into a microphone, so that power of a battery is finally wasted.

SUMMARY

As described above, it is necessary to activate a touch screen and a voice recognition module by detecting a movement by a gesture in an inactive state of the touch screen of a portable terminal wearable on a user's wrist, ankle, waist, and the like, to enable a user to operate the portable terminal without touching the portable terminal and minimize power consumption.

Accordingly, the present disclosure provides a portable terminal and a method of controlling a portable terminal by detecting a gesture.

Further, the present disclosure provides a portable terminal and a method of controlling a function of the portable terminal using voice recognition corresponding to detection of a gesture.

In accordance with an aspect of the present disclosure, there is provided a method of controlling a function of a portable terminal includes: detecting a gesture; activating a voice recognition module in response to the detected gesture; and analyzing a voice input into the activated voice recognition module, and executing a function corresponding to the input voice.

The method may further include activating a touch screen in response to the detected gesture.

The voice recognition module may be activated when there is no movement for a predetermined time after the gesture is detected.

The gesture may be a movement raising a touch screen of the portable terminal making an altitude of the portable terminal higher.

The method may include scanning eyeballs of a user moving the portable terminal through one or more cameras when the gesture is a movement lowering a touch screen of the portable terminal making an altitude of the portable terminal lower.

The method may further include activating the voice recognition module when the gesture is the movement lowering a touch screen of the portable terminal, and the eyeballs of the user are detected.

The method may further include maintaining the voice recognition module in an inactive state when the gesture is the movement lowering a touch screen of the portable terminal making an altitude of the portable terminal lower, and the eyeballs of the user are not detected.

Whether to execute a function corresponding to the voice input into the portable terminal according to the present disclosure is determined based on whether user's personal information is included.

In accordance with another aspect of the present disclosure, there is provided a method of controlling a function by using voice recognition of a portable terminal, including: determining whether there is a movement of the portable terminal for a predetermined time after detection of a gesture; activating a voice recognition module of the portable terminal; and determining whether a function corresponding to a voice input into the voice recognition module includes personal information, and determining whether to execute the function.

The method may include activating a touch screen when there is no movement of the portable terminal for the predetermined time.

The method may include executing a function corresponding to the voice when the function does not include the personal information The method may further include outputting a fact that a function corresponding to the voice is not executable when the function includes the personal information.

The method may include outputting a list including one or more functions executable in response to the voice with a voice or displaying a list including one or more functions executable in response to the voice on the touch screen.

The method may further include, when a command is not input for a predetermined time after the function is executed, switching the function to be in an inactive state.

In accordance with another aspect of the present disclosure, there is provided a portable terminal controlling a function by using voice recognition, including: a touch screen that executes one or more functions; a sensor module that detects a gesture; and a controller that activates a voice recognition module in response to the detected gesture and analyzes an input voice, and controls execution of a function corresponding to the input voice.

The sensor module may detect whether the gesture is a movement raising a touch screen of the portable terminal making an altitude of the portable terminal higher.

The controller may activate the touch screen and a microphone for receiving the voice when the portable terminal is maintained in a horizontal state for a predetermined time after the gesture is detected.

The controller may control one or more cameras in order to recognize eyeballs of a user moving the portable terminal when the gesture is a movement making the touch screen of the portable terminal be laid to be lowered making an altitude of the portable terminal lower.

The controller may execute the function corresponding to the voice when the function does not include the personal information, and output a fact that the function corresponding to the voice is not executable to the user when the function includes the personal information.

According to the present disclosure, it is possible to control the portable terminal by a gesture and a voice without using a finger in order to execute a function included in the portable terminal, and to conveniently use a voice function with low power.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
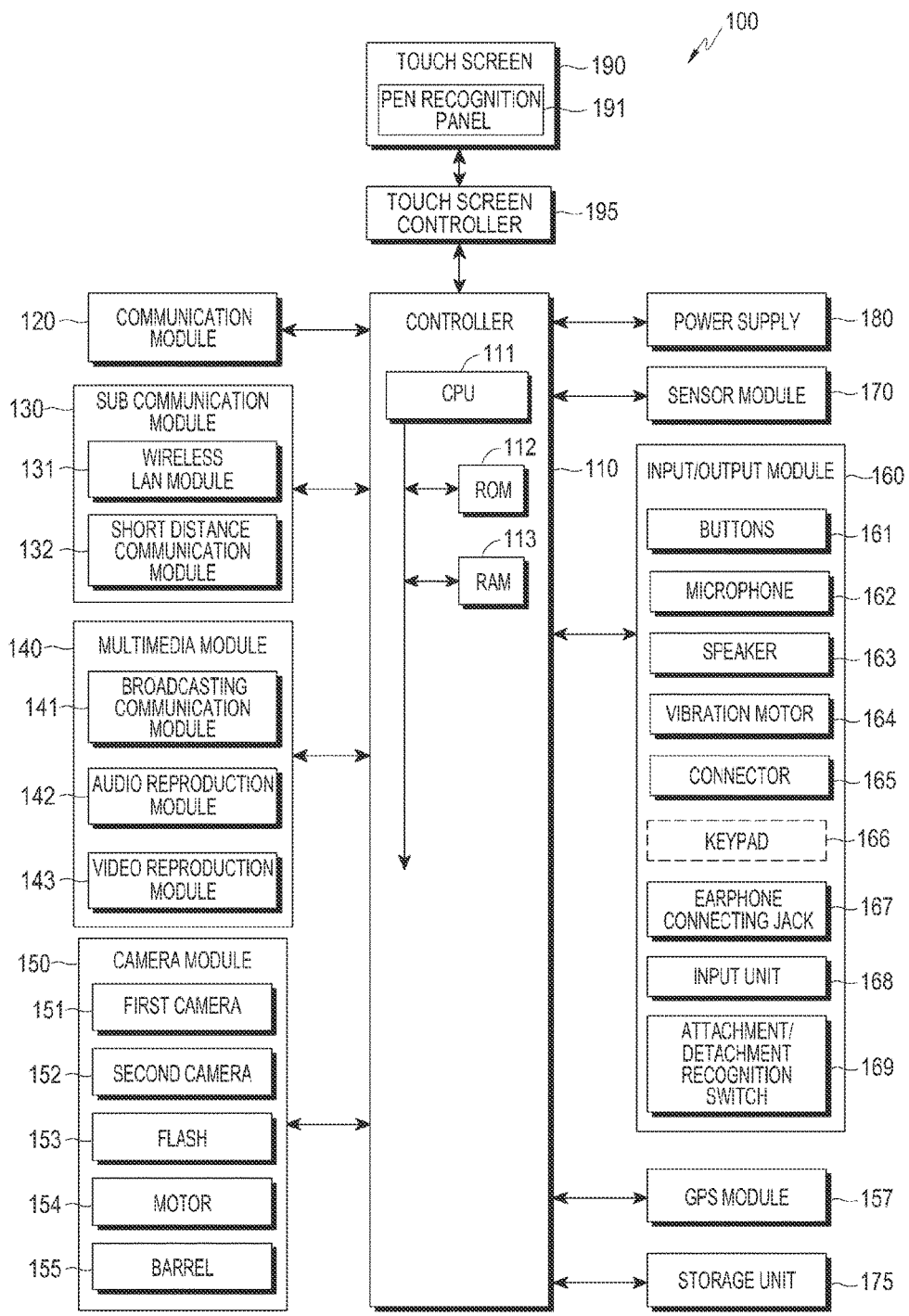
FIG. 1 is a block diagram schematically illustrating a portable terminal according to an exemplary embodiment of the present disclosure.

The present disclosure may have various modifications and various embodiments, among which specific embodiments will now be described more fully with reference to the accompanying drawings. However, it should be understood that the present disclosure is not limited to the specific embodiments, but the present disclosure includes all modifications, equivalents, and alternatives within the spirit and the scope of the present disclosure.

Although the terms including an ordinal number such as first, second, etc. can be used for describing various elements, the structural elements are not restricted by the terms. The terms are only used to distinguish one element from another element. For example, without departing from the scope of the present disclosure, a first structural element may be named a second structural element. Similarly, the second structural element also may be named the first structural element. As used herein, the term "and/or" includes any and all combinations of one or more associated items.

The terms used in this application is for the purpose of describing particular embodiments only and is not intended to limit the disclosure. As used herein, the singular forms are intended to include the plural forms as well, unless the context clearly indicates otherwise. In the description, it should be understood that the terms "include" or "have" indicate existence of a feature, a number, a step, an operation, a structural element, parts, or a combination thereof, and do not previously exclude the existences or probability of addition of one or more another features, numeral, steps, operations, structural elements, parts, or combinations thereof.

Unless defined differently, all terms used herein, which include technical terminologies or scientific terminologies, have the same meaning as that understood by a person skilled in the art to which the present disclosure belongs. It should be interpreted that the terms, which are identical to those defined in general dictionaries, have the meaning identical to that in the context of the related technique. The terms should not be ideally or excessively interpreted as a formal meaning.

Hereinafter, an operation principle of embodiments of the present disclosure will be described in detail with reference to the accompanying drawings. In the following description of embodiments of the present disclosure, a detailed description of known functions or configurations incorporated herein will be omitted when it is determined that the detailed description thereof may unnecessarily obscure the subject matter of the present disclosure. The terms which will be described below are terms defined in consideration of the functions in the present disclosure, and may be different according to users, intentions of the users, or customs. Therefore, the definitions of the terms should be determined based on the contents throughout the specification.

First, terms to be used in the present disclosure will be defined as follows.

Portable terminal: A mobile terminal which is portable, can be worn on the body of a user, such as on the wrist, ankle, and waist, and is capable of performing transmitting/receiving data and voice and video calls, and includes all of the terminals including at least one touch screen.

Input unit: At least one of a finger, an electronic pen, a digital pen, a pen including no integrated circuit, a pen including an integrated circuit, a pen including an integrated circuit and a memory, a pen capable of establishing short range communication, a roll pen reading a text, a joystick, and a stylus pen, which are capable of providing a command or an input to a portable terminal in a contact state on a touch screen or a non-contact state, such as a hovering.

FIG. 1 is a block diagram schematically illustrating a portable terminal according to an embodiment of the present disclosure.

Referring to FIG. 1, a portable terminal 100 may be connected with an external device (not shown) by using at least one of a mobile communication module 120, a sub communication module 130, a connector 165, and an earphone connecting jack 167. The external device includes various devices detachably attached to the portable terminal 100 by a wire, such as earphones, an external speaker, a Universal Serial Bus (USB) memory, a charger, a cradle/dock, a Digital Multimedia Broadcasting (DMB) antenna, a mobile payment related device, a health management device (blood sugar tester or the like), a game machine, and a car navigation device. Further, the electronic device includes a Bluetooth communication device, a Near Field Communication (NFC) device, a WiFi Direct communication device, and a wireless Access Point (AP) which may wirelessly access a network. The portable terminal may be connected with other devices, for example, a mobile phone, a smart phone, a tablet Personal Computer (PC), a desktop PC, and a server in a wired or wireless manner.

Referring to FIG. 1, the portable terminal 100 includes at least one touch screen 190 and at least one touch screen controller 195. Also, the portable terminal 100 includes a controller 110, a mobile communication module 120, a sub-communication module 130, a multimedia module 140, a camera module 150, a GPS module 157, an input/output module 160, a sensor module 170, a storage unit 175, and a power supply unit 180.

The sub communication module 130 includes at least one of a wireless Local Area Network (LAN) module 131 and a short range communication module 132, and the multimedia module 140 includes at least one of a broadcasting communication module 141, an audio reproduction module 142, and a video reproduction module 143. The camera module 150 includes at least one of a first camera 151 and a second camera 152. Further, the camera module 150 of the portable terminal 100 of the present disclosure includes at least one of a barrel 155 for the zooming in/zooming out of first and/or second cameras 151 and 152, a motor unit 154 for controlling a movement of the barrel 155 to zoom in/zoom out, and a flash 153 for providing light for photographing according to a main use of the portable terminal 100. The input/output module 160 includes at least one of a button 161, a microphone 162, a speaker 163, a vibration motor 164, a connector 165, and a keypad 166.

The controller 110 may include a Central Processing Unit (CPU) 111, a Read Only Memory (ROM) 112 which stores control programs for controlling the user terminal 100, and a Random Access Memory (RAM) 113 which stores signals or data input from the outside of the portable terminal 100 or is used as a memory region for an operation executed in the portable terminal 100. The CPU 111 may include a single core, a dual core, a triple core, or a quad core. The CPU 111, the ROM 112 and the RAM 113 may be connected with each other via internal buses.

Further, the controller 110 may control the mobile communication module 120, the sub-communication module 130, the multimedia module 140, the camera module 150, the GPS module 157, the input/output module 160, the sensor module 170, the storage unit 175, the electric power supplying unit 180, the screen 190, and the screen controller 195.

Further, the controller 110 determines whether the hovering according to an approach of the input unit 168, such as an electronic pen, capable of making a touch, to any one object is recognized in a state where a plurality of objects is displayed on the touch screen 190, and identifies the object corresponding to a position where the hovering occurs. Furthermore, the controller 110 may detect a height from the mobile terminal 100 to the input unit and a hovering input event according to the height, and the hovering input event may include at least one of the press of a button formed on the input unit, knocking on the input unit, movement of the input unit with a speed faster than a predetermined speed, and a touch of an object. Further, when a hovering input event is generated, the controller 110 displays a predetermined hovering input effect corresponding to the hovering input event on the touch screen 190.

Further, when a gesture is detected by the sensor module 170, the controller 110 activates a voice recognition module in accordance with the detected gesture, and analyzes a voice input into the activated voice recognition module. The controller 110 activates a function corresponding to the input voice and displays the activated function on the touch screen 190. The portable terminal 100 may be attached to an arm, a leg, and the like of a user, and the controller 110 may detect a gesture of the portable terminal through the sensor module 170. Further, in order to activate the voice recognition module, the controller 110 may determine whether the gesture is a movement for activating the voice recognition module or a generally generated movement based on various information on a predetermined speed, angle, time, altitude, and the like. Further, the controller 110 may map various functions to the movements according to an angle, speed, time, and altitude of the gesture, and execute functions corresponding to the various movements. For example, when the portable terminal 100 does not move for a predetermined time after moving 90° or more, the controller 110 may activate the voice recognition module. Each function may be executed or output by a voice input, and may be preset by a user or a manufacturing company. Further, the portable terminal may include a plurality of functions. The functions may be divided into a function including user's personal information and a function including no user's personal information. The personal information may include private information about a user of the portable terminal, and information one would be reluctant to provide to other people. For example, the personal information may include a phone book, e-mails, text messages, a call list, a diary, a messenger, a photo album, and the like, and the present disclosure may include various functions capable of including personal information, in addition to the aforementioned matters, and the functions may be set to provided or not to be provided to others according to the selection of a user. Further, the function including no personal information includes various functions, such as Internet searches, calls, map searches, broadcasts viewing, and news viewing. The function including no personal information is a function by which user information is not exposed even though the function is disclosed to an unspecified individual or unspecified individuals, or executed. The function including no personal information may be set to be provided or not to be provided to others according to selection of a user.

Further, when the gesture is detected and there is no movement for a predetermined time, the controller 110 activates at least one of the voice recognition module and the touch screen 190. The voice recognition module may be activated in cases where there is no movement for the predetermined time after the gesture is detected. Further, the gesture includes a movement making the touch screen of the portable terminal head in an up direction while an altitude of the portable terminal 100 becomes high. Further, in cases where the gesture is a movement making the touch screen of the portable terminal head in a down direction while an altitude of the portable terminal 100 becomes low, the controller 110 controls at least one camera capable of recognizing or scanning the eyeballs of the user which make the portable terminal move. The controller 110 may determine whether the touch screen 190 of the portable terminal 100 heads up or down, or is erect through the sensor module 170. Further, in the state where the gesture is generated, the state where there is no movement for the predetermined time after the gesture is generated, or in the state where the eyeballs of the user are recognized or scanned by at least one camera in the state where there is no movement for the predetermined time after the gesture is generated, the controller 110 controls at least one of the voice recognition module and the touch screen 190 to be in an active state. When there is no movement for the predetermined time after the gesture is generated, but the eyeballs of the user are not recognized or scanned, the controller 110 controls at least one of the voice recognition module and the touch screen 190 to be in an inactive state.

Further, the controller 110 may analyze whether the portable terminal 100 maintains a horizontal state for a predetermined time after the detection of the gesture and activates the voice recognition module. When the portable terminal 100 maintains the horizontal state for the predetermined time, the controller 110 activates at least one of the touch screen and the voice recognition module. Further, the controller 110 determines whether the function corresponding to the voice input into the voice recognition module includes personal information and determines whether to execute the function. When the voice is a voice for executing the function including personal information, the controller 110 may output an execution disallowance to the user, and output the executable function through the touch screen 190. When the function corresponding to the input voice is a function including no the user's personal information, the controller 110 executes the function. However, when the function corresponding to the input voice is a function including the user's personal information, the controller 110 outputs information notifying disallowance of the execution of the function to the user. The information may be output by various methods, such as a voice, an alarm sound, a pop-up window, and a display, but the present disclosure is not limited thereto. Further, the controller 110 may display a list, in which one or more functions executable by the voice input are enumerated, on the touch screen 190 through a pop-up window. Further, when a command is not input for a predetermined time after the execution of the function, the controller 110 switches the executed function to be in an inactive state, and switches the touch screen to a sleep mode.

The sleep mode is a mode in which power is not applied to the touch screen in order to prevent consumption of battery power.

The mobile communication module 120 enables the portable terminal 100 to be connected with the external device through mobile communication by using at least one antenna or a plurality of antennas (not shown) according to a control of the controller 110. The mobile communication module 120 transmits/receives a wireless signal for a voice call, a video call, a Short Message Service (SMS), or a Multimedia Message Service (MMS) to/from a mobile phone (not shown), a smart phone (not shown), a tablet PC, or another device (not shown), which has a phone number input into the portable terminal 100.

The sub-communication module 130 may include at least one of the wireless LAN module 131 and the short range communication module 132. For example, the sub-communication module 130 may include only the wireless LAN module 131, only the short-range communication module 132, or both the wireless LAN module 131 and the short-range communication module 132. Further, the sub-communication module 130 transceives a control signal with the input unit 168. The control signal transceived between the portable terminal 100 and the input unit may include at least one of a field for supplying power to the input unit, a field detecting a touch or a hovering between the input unit and the screen 190, a field detecting a press or an input of a button included in the input unit, an identifier of the input unit, and a field indicating an X-axis coordinate and a Y-axis coordinate at which the input unit is located. Further, the input unit 168 transmits a feedback signal for the control signal received from the portable terminal 100 to the portable terminal 100.

The wireless LAN module 131 may be connected to the Internet in a place where a wireless Access Point (AP) (not shown) is installed, under a control of the controller 110. The wireless LAN module 131 supports a wireless LAN standard (IEEE802.11x) of the Institute of Electrical and Electronics Engineers (IEEE). The short-range communication module 132 may perform local area communication wirelessly between the portable terminal 100 and an image forming apparatus (not shown) according to the control of the controller 110. The short-range communication scheme may include a Bluetooth communication scheme, an Infrared Data Association (IrDA) scheme, a Wi-Fi Direct communication scheme, a Near Field Communication (NFC) scheme, and the like.

The controller 110 may communicate with an adjacent communication device or a remote communication device through at least one of the sub-communication module 130 and the wireless LAN module 131, and communicate with the input unit. The communication may be performed by transmission and reception of the control signal.

According to the performance, the portable terminal 100 may include at least one of the mobile communication module 120, the wireless LAN module 131, and the local area communication module 132. For example, the mobile terminal 100 may include a combination of the mobile communication module 120, the wireless LAN module 131, and the short range communication module 132 according to a capability thereof. In the present disclosure, at least one or a combination of the mobile communication module 120, the wireless LAN module 131, and the short-range communication module 132 are referred to as a transmitter/receiver, without limiting the scope of the present disclosure.

The multimedia module 140 may include the broadcasting communication module 141, the audio reproduction module 142, or the video reproduction module 143. The broadcasting communication module 141 may receive a broadcasting signal (e.g., a TV broadcasting signal, a radio broadcasting signal or a data broadcasting signal) or broadcasting additional information (e.g., Electric Program Guide (EPS) or Electric Service Guide (ESG)) which are transmitted from a broadcasting station, through a broadcasting communication antenna (not illustrated), under the control of the controller 110. The audio reproduction module 142 may reproduce a stored or received digital audio file, e.g., a file having a file extension of mp3, wma, ogg, or wav, under a control of the controller 110. The video reproduction module 143 can reproduce a digital video file (for example, a file having a file extension of mpeg, mpg, mp4, avi, mov, or mkv) stored or received, under a control of the controller 110. The video reproduction module 143 can reproduce the digital audio file. The video reproduction module 143 may reproduce a digital audio file.

The multimedia module 140 may include the audio reproducing module 142 and the video reproducing module 143 except for the broadcasting communication module 141. Further, the audio reproduction module 142 or the video reproduction module 143 of the multimedia module 140 may be included in the controller 110.

The camera module 150 may include at least one of the first camera 151 and the second camera 152 which photograph a still image or a moving image under the control of the controller 110. Further, the camera module 150 may include at least one of the barrel 155 while performs zoom-in/out for photographing a subject, the motor 154 controlling a motion of the barrel 155, and the flash 153 providing an auxiliary light required for photographing a subject. The first camera 151 may be disposed on a front surface of the portable terminal 100, and the second camera 152 may be disposed on a rear surface of the portable terminal 100. In a different way, the first camera 151 and the second camera 152 are arranged adjacently to each other (e.g., an interval between the first camera 151 and the second camera 152 is larger than 1 cm or smaller than 8 cm) to photograph a 3D still image or a 3D moving image.

Each of the first and second cameras 151 and 152 includes a lens system, an image sensor and the like. The first and second cameras 151 and 152 convert optical signals input (or taken) through the lens system into electric image signals, and output the electric image signals to the controller 110. The user takes a video or a still image through the first and second cameras 151 and 152.

The GPS module 157 may receive radio waves from a plurality of GPS satellites (not illustrated) in Earth's orbit and calculate a position of the portable terminal 100 by using Time of Arrival information from the GPS satellites to the portable terminal 100.

The input/output module 160 may include at least one of a plurality of buttons 161, the microphone 162, the speaker 163, the vibration motor 164, the connector 165, the keypad 166, the earphone connecting jack 167, and the input unit 168. The input/output module is not limited thereto, and a cursor control, such as a mouse, a trackball, a joystick, or cursor direction keys, may be provided to control a movement of the cursor on the touch screen 190.

The buttons 161 may be formed on the front surface, side surfaces or rear surface of the housing of the user terminal 100 and may include at least one of a power/lock button (not illustrated), a volume button (not illustrated), a menu button, a home button, a back button, and a search button 161.

The microphone 162 receives a voice or a sound to generate an electrical signal under the control of the controller 110. Further, the microphone 162 may receive a voice or a sound under the control of the controller 110 regardless of activation or inactivation of the touch screen 190.

The speaker 163 may output sounds which respectively correspond to various signals of the mobile communication module 120, the sub-communication module 130, the multimedia module 140, and the camera module 150 (e.g., a radio signal, a broadcasting signal, a digital audio file, a digital moving image file, or photographing) to the outside of the portable terminal 100 according to the control of the control unit 110. Further, the speaker 163 may output a sound corresponding to a control signal transmitted to the input unit 168 through the short range communication module 132. The sound corresponding to the control signal includes a sound according to activation of a vibration device 520 of the input unit 168, a sound of which a magnitude is changed in accordance with an intensity of a vibration, and a sound according to inactivation of the vibration device 520. Further, the speaker 163 may output a sound (for example, a button tone corresponding to phone communication or a ring tone) corresponding to a function performed by the portable terminal 100. One or more speakers 163 may be formed on a suitable position or positions of the housing of the portable terminal 100.

The vibration motor 164 may convert an electrical signal into mechanical vibration under the control of the controller 110. For example, when the user terminal 100 in a vibration mode receives a voice call from any other apparatus (not illustrated), the vibration motor 164 is operated. One or more vibration motors 164 may be provided in the housing of the portable terminal 100. The vibration motor 164 may operate in response to a touch action of the user on the touch screen 190 and successive motions of touches on the touch screen 190.

The connector 165 may be used as an interface for connecting the portable terminal with an external device (not shown) or a power source (not shown). The portable terminal 100 may transmit or receive data stored in the storage unit 175 of the portable terminal 100 to or from an external device (not shown) through a wired cable connected to the connector 165 according to a control of the controller 110.

The keypad 166 may receive a key input from a user for control of the portable terminal 100. The keypad 166 includes a physical keypad (not shown) formed in the portable device 100 or a virtual keypad (not shown) displayed on the touch screen 190. The physical keypad (not shown) formed on the portable terminal 100 may be omitted according to the capability or configuration of the portable terminal 100.

Earphones (not shown) may be inserted into the earphone connecting jack 167 to be connected to the portable terminal 100, and the input unit 168 may be inserted into and stored in the portable terminal 100 and may be withdrawn or detached from the portable terminal 100 when being used. In addition, an attachment/detachment recognition switch 169 operating in response to attachment or detachment of the input unit 168 is provided in one area within the portable terminal 100 into which the input unit 168 is inserted, and provides a signal corresponding to the attachment or detachment of the input unit 168 to the controller 110. The attachment/detachment recognition switch 169 is located in one area into which the input unit 168 is inserted to directly or indirectly contact the input unit 168 when the input unit 168 is mounted. Accordingly, the attachment/detachment recognition switch 169 generates a signal corresponding to the attachment or the detachment of the input unit 168 based on the direct or indirect contact with the input unit 168 and then provides the generated signal to the controller 110.

The sensor module 170 includes at least one sensor for detecting a state of the portable terminal 100. For example, the sensor module 170 may include a proximity sensor that detects a user's proximity to the portable terminal 100, an illumination sensor (not shown) that detects a quantity of light around the portable terminal 100, a motion sensor (not shown) that detects a motion (e.g., rotation of the portable terminal 100 and acceleration or a vibration applied to the portable terminal 100) of the portable terminal 100, a geo-magnetic sensor (not shown) that detects a compass point by using Earth's magnetic field, a gravity sensor that detects an action direction of gravity, and an altimeter that detects an altitude through measuring an atmospheric pressure. At least one of the sensors can detect the state, generate a signal corresponding to the detection, and transmit the generated signal to the controller 110. The sensor module 170 may analyze a direction in which the touch screen is oriented, as well as the altitude of the portable terminal 100. The sensor module 170 may determine whether the touch screen rises or lowers when the altitude of the portable terminal 100 becomes higher, and further determines whether the touch screen rises or lowers when the altitude of the portable terminal 100 becomes lower. The sensor of the sensor module 170 may be added or omitted according to a capability of the portable terminal 100.

The storage unit 175 may store signals or data which correspondingly input/output to an operation of the mobile communication module 120, the sub-communication module 130, the multimedia module 140, the camera module 150, the GPS module 157, the input/output module 160, the sensor module 170, and the touch screen 190 under the control of the controller 110. The storage unit 175 may store applications and control programs for control of the portable terminal 100 or the controller 110.

The term "storage unit" includes the storage unit 175, the ROM 112 and the RAM 113 within the controller 110, or a memory card (not shown) (for example, an SD card or a memory stick) installed in the portable terminal 100. Further, the storage unit may include a nonvolatile memory, a volatile memory, a Hard Disk Drive (HDD), or a Solid State Drive (SSD).

The storage unit 175 may store various applications such as a navigation, a video call, a game, a time-based alarm application, and the like; images for providing a Graphical User Interface (GUI) related to the applications; a database or data related to methods for processing user information, documents, and a touch input; background images (e.g., a menu screen, a standby screen, etc.) or operating programs required for operating the portable terminal 100; and images photographed by the camera module 150. The storage unit 175 is a machine (for example, computer)-readable medium. The term "machine-readable medium" may be defined as a medium capable of providing data to the machine so that the machine performs a specific function. The machine readable medium may be a storage medium. The storage unit 175 may include a non-volatile medium and a volatile medium. All of these media should be of a type that allows commands transferred by the media to be detected by a physical mechanism through which the machine reads the commands.

The machine-readable medium includes at least one of a floppy disk, a flexible disk, a hard disk, a magnetic tape, a Compact Disc Read-Only Memory (CD-ROM), an optical disk, a punch card, a paper tape, a Random Access Memory (RAM), a Programmable Read-Only Memory (PROM), an Erasable PROM (EPROM), and a flash-EPROM, but is not limited thereto.

The power supply unit 180 may supply power to one or more batteries (not illustrated) disposed in the housing of the portable terminal 100 under the control of the controller 110. The one or more batteries (not illustrated) supply power to the portable terminal 100.

The portable terminal 100 may include at least one touch screen providing user interfaces corresponding to various services (for example, a phone call, data transmission, broadcasting, and photography) to the user. Each screen may transmit an analog signal corresponding to at least one touch input into the user interface to the corresponding screen controller. The portable terminal 100 may include a plurality of touch screens, and each of the touch screens may be provided with a touch screen controller that receives an analog signal corresponding to a touch. The touch screens may be connected to a plurality of housings through hinge connections, respectively, or the plurality of touch screens may be located in a housing without the hinge connection. As described above, the portable terminal 100 according to the present disclosure may include at least one touch screen, and for convenience of description, one touch screen will be described hereinafter.

The screen 190 may receive at least one touch through a user's body, e.g., fingers including a thumb, or a touchable input unit, e.g., a stylus pen or an electronic pen. Further, when a touch is input through a pen such as a stylus pen or an electronic pen, the touch screen 190 includes a pen recognition panel 191 that recognizes the touch input, and the pen recognition panel 191 may grasp a distance between the pen and the touch screen 190 through a magnetic field. Moreover, the touch screen 190 may receive a continuous motion of one touch among at least one or more touches. The touch screen 190 can output an analog signal corresponding to the successive motions of the input touch to the touch screen controller 195.

The touch according to the present disclosure is not limited to the contact between the screen 190 and the user's body or the input unit capable of making a touch, and may include a non-contact (for example, an interval (for example, within 5 mm) which may be detected without the contact between the screen 190 and the user's body or the touchable input unit). A detectable interval in the touch screen 190 may be varied according to the performance or the structure of the portable terminal 100, and more particularly, the touch screen 190 is configured such that values detected by a touch event and a hovering event (e.g., values including a voltage value or a current value as an analog value) may be output differently from each other, in order to differently detect the touch event through the contact between the touch screen and the user's body or the touchable input unit, and the input event in a non-contact state (e.g., a hovering event). Further, it is preferable that the screen 190 differently outputs detected values (for example, a current value or the like) according to a distance between a position in the air where the hovering event is generated and the touch screen 190.

The touch screen 190 may be implemented in, for example, a resistive type, a capacitive type, an infrared type, or an acoustic wave type.

The touch screen 190 may include at least two touch screen panels, which can detect touches or close access through the user's body and the touchable input unit, respectively, in order to sequentially or simultaneously receive the inputs through the user's body and the touchable input unit. The at least two touch screen panels may provide different output values to the touch screen controller, and the touch screen controller may differently recognize the values input from the at least two touch screen panels and identify whether the input from the touch screen 190 corresponds to the input by the user's body or the input by the touchable input unit. Further, the screen 190 displays one or more objects.

More particularly, the screen 190 has a structure including a touch panel which detects an input by a finger or an input unit through a change of induced electromotive force and a panel which detects a touch of a finger or an input unit on the screen 190, which are layered on each other closely or spaced from each other. The touch screen 190 includes a plurality of pixels and displays an image through the pixels. The touch screen 190 may use a Liquid Crystal Display (LCD), an Organic Light Emitting Diode (OLED), or an Light Emitting Diode (LED).

The touch screen 190 includes a plurality of sensors that detect, when the input unit 168 touches a surface of the touch screen 190 or approaches within a predetermined range from the touch screen 190, a position where the input unit 168 is located. The plurality of sensors may be formed with a coil structure, and in a sensor layer formed of the plurality of sensors, the sensors are arranged in a predetermined pattern and form a plurality of electrode lines. When the touch input or the hovering input is generated on the touch screen 190 through the finger or the input unit 168, a detection signal, of which a waveform is changed, is generated by capacitance between the sensor layer and the input unit, and the touch screen 190 transmits the generated detection signal to the controller 110 by the aforementioned structure. A predetermined distance between the input unit 168 and the touch screen 190 may be recognized through an intensity of a magnetic field generated by a coil 430.

Further, when the portable terminal 100 maintains the horizontal state for a predetermined time after the gesture of the portable terminal 100 is detected by the sensor module 170, the touch screen 190 is activated under the control of the controller 110. The activation refers to a mode change of the touch screen 190 from the sleep mode to an awake mode, and refers to the display of a lock screen or the display of a wallpaper under the setting of the user. As described above, the touch screen 190 may be changed into the active state in response to the case where the portable terminal 100 moves under the control of the controller 110. Further, the active state includes activating the microphone 162 included in the portable terminal 100. The gesture includes a gesture for raising the touch screen of the portable terminal 100 making the altitude of the portable terminal 100 higher, such as a gesture of bending, by the user wearing the portable terminal, an arm toward the front of a chest in a front direction in order to see the watch. In this case, the controller 110 calculates a time for which the arm is bent in the front direction, compares the calculated time and a predetermined time, and changes the touch screen 190 to be in the active state when the time for which the arm is bent exceeds the predetermined time. The activation of the touch screen 190 by the bending of the arm is applicable to a left arm mode and a right arm mode. Further, the gesture for activating the touch screen 190 may be set or changed by the user or a manufacturing company.

Further, the touch screen 190 displays a corresponding function in accordance with a voice (or the command) input through the microphone 162 under the control of the controller 110. When the input voice corresponding to the functions (for example, a phone book searching function, e-mail, text messages, a call list, a diary, a messenger, or a photo album), execution of which is not allowed, the touch screen 190 outputs disallowance of the execution of the function to the user, and displays at least one executable function through a pop-up window. Further, when a command is not input from the user for a predetermined time, the touch screen 190 is switched to be in the inactive state.

Meanwhile, the touch screen controller 195 converts an analog signal received from the touch screen 190 to a digital signal (for example, X and Y coordinates) and then transmits the digital signal to the controller 110. The controller 110 can control the touch screen 190 by using the digital signal received from the touch screen controller 195. For example, the controller 110 allows a short-cut icon (not shown) or an object displayed on the touch screen 190 to be selected or executed in response to a touch event or a hovering event. Further, the touch screen controller 195 may be included in the controller 110.

Moreover, the touch screen controller 195 may identify a distance between a position in the air where the hovering is generated and the touch screen 190 by detecting a value (for example, a current value or the like) output through the touch screen 190, convert the identified distance value to a digital signal (for example, a Z coordinate), and then provide the converted digital signal to the controller 110.

Figure 2:
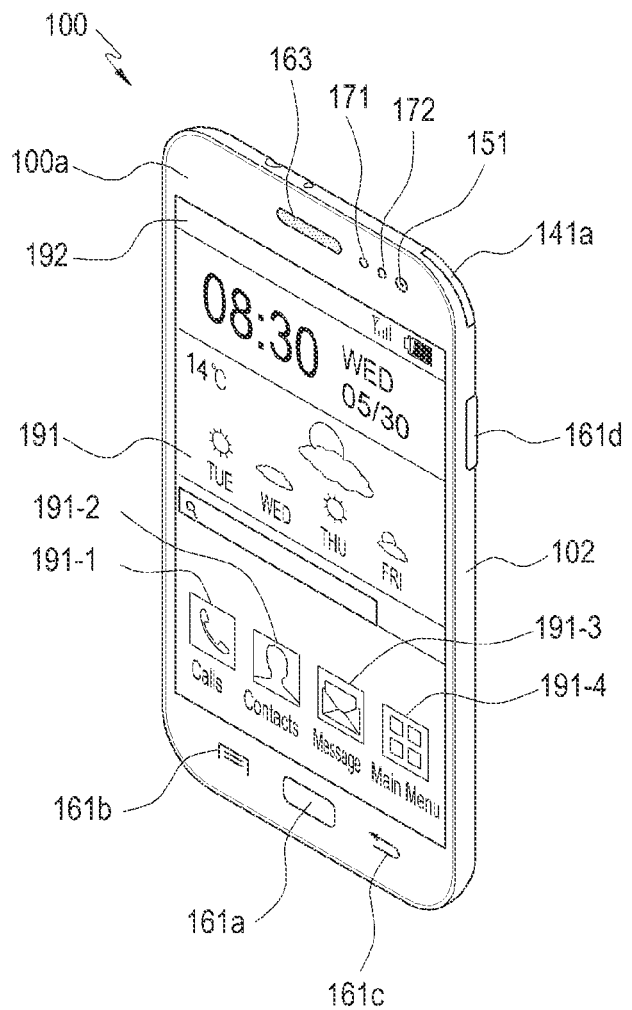
FIG. 2 is a front perspective view of the portable terminal according to the exemplary embodiment of the present disclosure.
Figure 3:
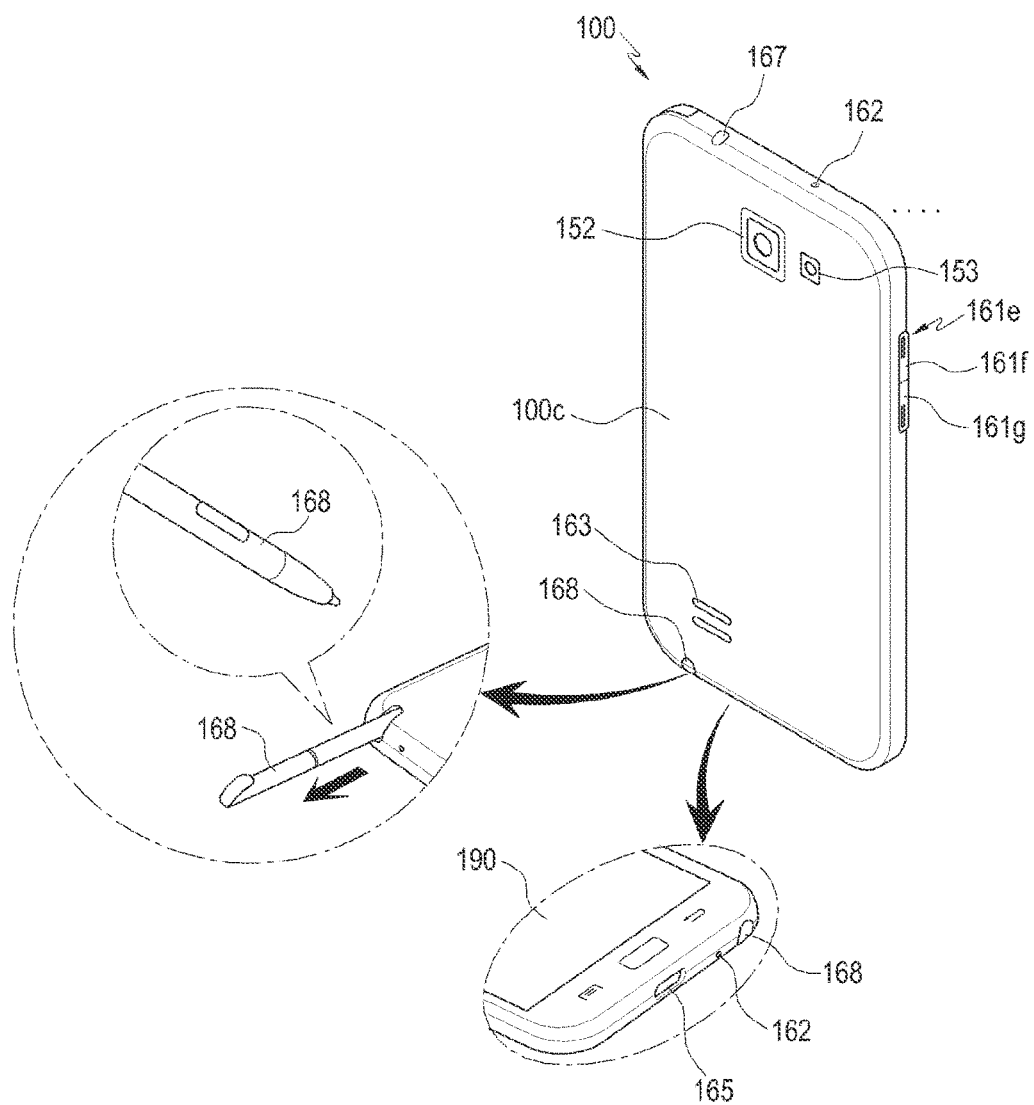
FIG. 3 is a rear perspective view of the portable terminal according to the exemplary embodiment of the present disclosure.

FIG. 2 is a front perspective view of the portable terminal according to the exemplary embodiment of the present disclosure, and FIG. 3 is a rear perspective view of the portable terminal according to the exemplary embodiment of the present disclosure.

Referring to FIGS. 2 and 3, the touch screen 190 is disposed in a center of a front surface 100a of the portable terminal 100. The touch screen 190 may have a large size to occupy most of the front surface 100a of the portable terminal 100. FIG. 2 shows an example of a main home screen displayed on the touch screen 190. The main home screen is a first screen displayed on the touch screen 190 when electric power of the mobile terminal 100 is turned on. Further, when the portable terminal 100 has different home screens of several pages, the main home screen may be a first home screen of the home screens of several pages. Shortcut icons 191-1, 191-2, and 191-3 for executing frequently used applications, a main menu switching key 191-4, time, weather and the like may be displayed on the home screen. The main menu switch key 191-4 displays a menu screen on the touch screen 190. At the top end of the touch screen 190, a status bar 192 may be formed that indicates the status of the portable terminal 100 such as the battery charge status, the intensity of a received signal and current time.

A home button 161a, a menu button 161b, and a back button 161c may be formed at a lower portion of the touch screen 190.

The main home screen is displayed on the touch screen 190 through the home button 161a. For example, when the home key 161a is touched in a state where a home screen different from the main home screen or the menu screen is displayed on the touch screen 190, the main home screen may be displayed on the touch screen 190. Further, when the home button 191a is touched while applications are being executed on the touch screen 190, the main home screen as illustrated in FIG. 2 may be displayed on the touch screen 190. Further, the home button 161a may be used to display recently used applications or a task manager on the touch screen 190.

The menu button 161b provides a connection menu which can be used on the touch screen 190. The connection menu may include a widget addition menu, a background changing menu, a search menu, an editing menu, an environment setting menu, and the like.

The back button 161c may display the screen which was executed just before the currently executed screen or may end the most recently used application.

The first camera 151, an illumination sensor 170a, and a proximity sensor 170b may be disposed on edges of the front surface 100a of the portable terminal 100. The second camera 152, the flash 153, and the speaker 163 may be disposed on a rear surface 100c of the portable terminal 100.

A power/reset button 160a, a volume button 161b, a terrestrial DMB antenna 141a for reception of a broadcast, and one or more microphones 162 may be disposed on a side surface 100b of the portable terminal 100. The DMB antenna 141a may be fixed to the portable terminal 100 or may be formed to be detachable from the portable terminal 100.

Further, the portable terminal 100 has the connector 165 arranged on a lower side surface thereof. A plurality of electrodes are formed in the connector 165, and the connector 165 may be wiredly connected to an external device. The earphone connecting jack 167 may be formed on an upper side surface of the portable terminal 100. Earphones may be inserted into the earphone connecting jack 167.

Further, the input unit 168 may be mounted to a lower side surface of the portable terminal 100. The input unit 168 can be inserted into the portable terminal 100 to be stored in the portable terminal 100, and withdrawn and separated from the portable terminal 100 when it is used.

Figure 4:
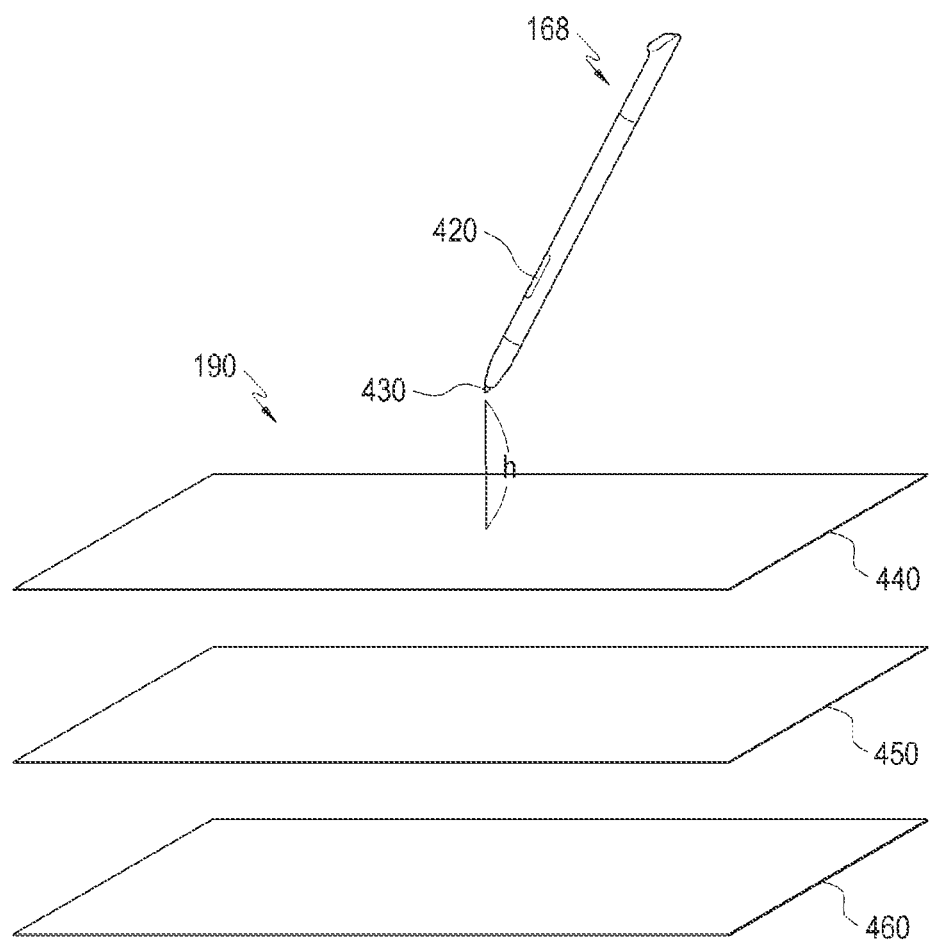
FIG. 4 is an internal cross-sectional view of an input unit and a touch screen according to the exemplary embodiment of the present disclosure.

FIG. 4 is an internal cross-sectional view of the input unit and the touch screen according to the exemplary embodiment of the present disclosure.

Referring to FIG. 4, the touch screen 190 includes a first touch panel 440, a display panel 450, and a second touch panel 460. The display panel 450 may be a panel such as a Liquid Crystal Display (LCD) panel or an Active Matrix Organic Light Emitting Diode (AMOLED) panel, and display various operation statuses of a portable terminal 100, various images according to execution and a service of an application, and a plurality of objects.

The first touch panel 440 is a capacitive type touch panel, which is coated with a dielectric in which both sides of a glass are coated with a metal conductive material (for example, an Indium Tin Oxide (ITO) film or the like) so that the first touch panel 440 allows a current to flow in the glass surface and stores a charge. When the input unit (for example, the finger of the user or the pen) is touched on the surface of the first touch panel 440, the predetermined amount of charges moves to the touched position by static electricity, and the first touch panel 440 recognizes the amount of current change according to the movement of the charges and detects the touched position. Through the first touch panel 440, all touches that can generate static electricity may be detected and a touch by a finger or a pen which is an input unit may also be detected.

The second touch panel 460 is an EMR type touch panel, which includes an electromagnetic induction coil sensor (not shown) having a grid structure including a plurality of loop coils arranged in a predetermined first direction and a second direction crossing the first direction and an electronic signal processor (not shown) for sequentially providing an AC signal having a predetermined frequency to each loop coil of the electromagnetic induction coil sensor. If the input device 168 in which a resonance circuit is embedded, is present near the loop coil of the pen recognition touch panel 460, a magnetic field transmitted from a corresponding loop coil causes electric current in the resonance circuit in the input device 168, based on a mutual electronic induction. An induction magnetic field is generated, based on the current, from a coil (not illustrated) that configures a resonance circuit in the interior of an input unit 168, the second touch panel 460 detects the induction magnetic field around the loop coil in a signal reception state to sense a hovering location or a touch location of the input unit 168, and a height (h) from the first touch panel 440 to a pen point 430 of the input unit 168. It will be readily understood by those skilled in the art to which the present disclosure pertains that the height (h) from the first touch panel 440 of the touch screen 190 to the nib 430 may vary depending on the performance or structure of the portable terminal 100. If an input unit causes a current based on electromagnetic induction through the second touch panel 460, a hovering event and a touch can be detected, and it will be described that the second touch panel 460 is to be used only for detection of the hovering event or the touch by the input unit 168. The input unit 168 may be referred to as an electromagnetic pen or an EMR pen. Further, the input unit 168 may be different from a general pen that does not include the resonance circuit detected through the first touch panel 440. The input unit 168 may include a button 420 that may change an electromagnetic induction value generated by a coil that is disposed, in an interior of a penholder, adjacent to the nib 430. The input unit 168 will be more specifically described below with reference to FIG. 5.

An operation mode of at least one of the first touch panel 440 and the second touch panel is switched under the control of the controller 110. That is, at least one of the first touch panel 440 and the second touch panel is switched to be in a mode corresponding to at least one parameter measured at a point at which the input unit 168 is positioned under the control of the controller 110. At least one of the first touch panel 440 and the second touch panel is switched to be in a passive mode or a digital mode according to a voltage at the point at which the input unit 168 is positioned, and a distance to the input unit. The passive mode is a mode in which the input unit is detected, but at least one of a mode switch and the mode control of the touch screen is not generated by the detected input unit. Further, the digital mode is a mode in which at least one of performance of communication with the detected input unit and power supply is performed. The digital mode is divided into a plurality of modes according to the data communication with the input unit, and whether a touch by the input unit is measurable. The plurality of modes includes a mode of not-detecting a hovering and a touch of the input unit, a mode of detecting a hovering of the input unit, and a mode of detecting a touch of the input unit. Further, the control signal may be transceived with the input unit in the plurality of modes. Further, the digital mode is divided into an active digital mode in which a battery is included in the input unit and a passive digital mode in which a battery is not included in the input unit. Further, when the detected input unit is a passive input unit which is not capable of receiving power from the portable terminal, at least one of the first touch panel 440 and the second touch panel is operated in the passive mode.

A touch screen controller 195 may include a first touch panel controller and a second touch panel controller. The first touch panel controller converts an analog signal received from the first touch panel 440 by a detection of a finger or pen touch to a digital signal (for example, X, Y, and Z coordinates) and transmits the converted digital signal to the controller 110. The second touch panel controller converts an analog signal, received from the second touch panel 460 through detection of a hovering event or a touch of the input unit 168, into a digital signal, and transmits the digital signal to the controller 110. The controller 110 may control the display panel 440, the first touch panel 450, and the second touch panel 460 by using the digital signals received from the first and second touch panel controllers. For example, the controller 110 may display a shape in a predetermined form on the display panel 230 in response to the hovering event or the touch of the finger, the pen, or the input unit 168.

Thus, the first touch panel may detect the touch by the user's finger or the pen, and the second touch panel may detect the hovering or the touch by the input unit 168 in the portable terminal 100 according to an embodiment of the present disclosure. Accordingly, the controller 110 of the portable terminal 100 can differently detect the touch by the user's finger or the pen and the hovering or the touch by the input unit 168. While only one touch screen is illustrated in FIG. 4, the present disclosure may include a plurality of touch screens, without being limited thereto. The plurality of touch screens may be disposed in housings, respectively, and may be connected with each other by hinges, or the plurality of touch screens may be disposed in a single housing. Each of the plurality of touch screens includes the display panel and at least one touch panel, as illustrated in FIG. 4.

Figure 5:
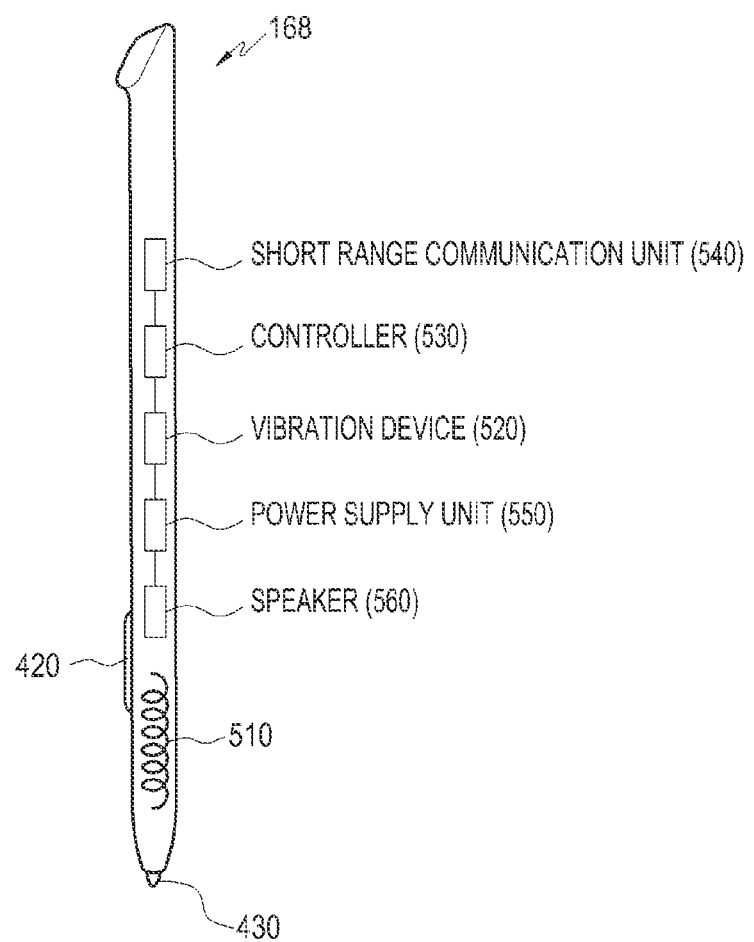
FIG. 5 is a block diagram illustrating the input unit according to the exemplary embodiment of the present disclosure.

FIG. 5 is a block diagram illustrating the input unit according to the exemplary embodiment of the present disclosure.

Referring to FIG. 5, the input unit (for example, touch pen) according to an embodiment of the present disclosure may include a penholder, a nib 430 arranged at an end of the penholder, the button 420 that can change an electromagnetic induction value generated by a coil 510 arranged within the penholder in an area adjacent to the nib 430, a vibration device 520 that vibrates when a hovering input effect is generated, a controller 530 that analyzes a control signal received from the portable terminal 100 by a hovering with the portable terminal 100 and controls a vibration intensity and a vibration cycle of the vibration device 520 in order to provide a haptic effect to the input unit 168 according to the analyzed control signal, a short range communication unit 540 that performs short range communication with the portable terminal 100, and a power supply unit 550 that supplies power for the vibration of the input unit 168. Further, the input unit 168 may include a speaker 560 for outputting a sound corresponding to a vibration period and/or a vibration intensity of the input unit 168. The speaker 560 may output a sound corresponding to a haptic effect provided to the input unit 168 together with the speaker 163 included in the portable terminal 100 or before/after a predetermined time (for example, 10 ms).

The input unit 168 having such a configuration as described above supports an electrostatic induction scheme. When a magnetic field is caused at a predetermined point of the touch screen 190 by the coil 510, the touch screen 190 may be configured to recognize a touch point through detecting a location of the corresponding magnetic field.

More specifically, the speaker 560 may output, under control of the controller 530, sounds corresponding to various signals (e.g., a wireless signal, a broadcasting signal, a digital audio file, and a digital video file) received from the mobile communication module 120, the sub-communication module 130, or the multimedia module 140 which is installed in the portable terminal 100. Further, the speaker 560 may output sounds corresponding to functions that the portable terminal 100 performs (e.g., a button manipulation tone corresponding to a telephone call, or a call connection tone), and one or a plurality of speakers 560 may be installed at a proper position or positions of a housing of the input unit 168.

When the pen point 430 contacts the touch screen 190 and is located at a location (for example, 5 mm) where hovering may be detected, the controller 530 analyzes at least one control signal received from the portable terminal 100 through the short range communication unit 540, and controls the vibration period and the vibration intensity of the vibration element 520, which is provided to the input unit 168, in response to the analyzed control signal.

Figure 6:
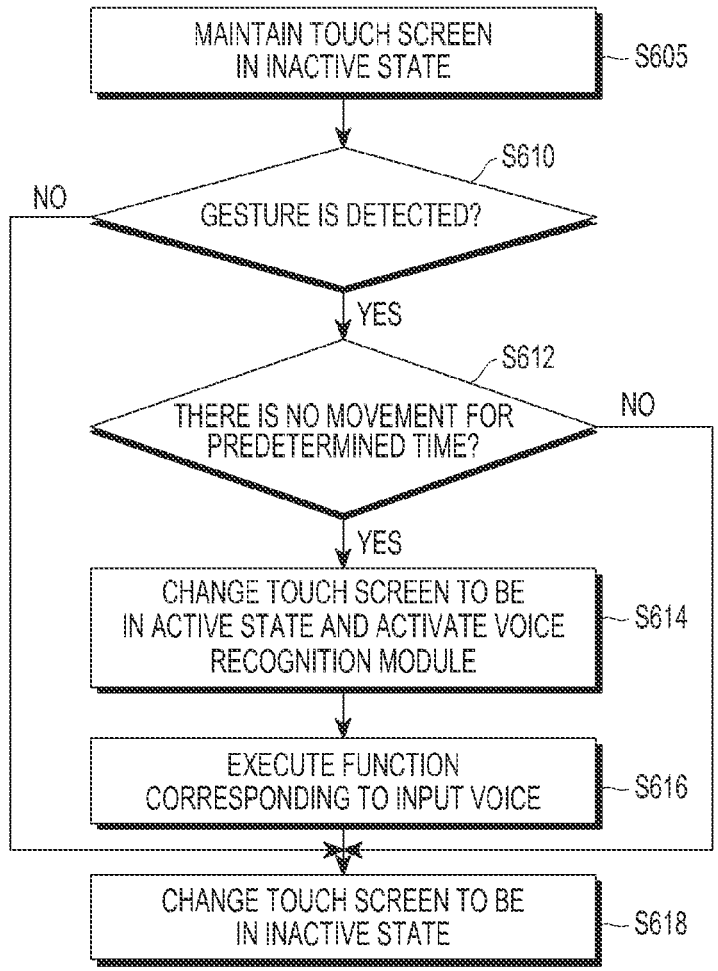
FIG. 6 is a flowchart illustrating a process of controlling a function of the portable terminal according to the exemplary embodiment of the present disclosure.

FIG. 6 is a flowchart illustrating a process of controlling a function of the portable terminal according to the exemplary embodiment of the present disclosure.

Hereinafter, a process of controlling a function of the portable terminal according to the exemplary embodiment of the present disclosure will be described in detail.

The portable terminal according to the exemplary embodiment of the present disclosure may activate the touch screen in response to a movement thereof, and activate the voice recognition module capable of recognizing a voice.

When any command or input is not input during a predetermined time, the touch screen provided on the portable terminal of the present disclosure is maintained in the inactive state, that is, the sleep mode (S605). The inactive state means a state in which the touch screen is turned off.

In the inactive state, when the movement of the portable terminal is detected, and there is no movement for the predetermined time, the controller 110 changes the state of the touch screen into the active state and activates the voice recognition module (S610, S612, and S614). The controller 110 activates the touch screen and the voice recognition module through a gesture or a movement of the portable terminal detected by the sensor module 170. When the gesture is detected, and then there is no movement or a horizontal state of the portable terminal is maintained for the predetermined time, the controller 110 activates the touch screen and activates the voice recognition module for detecting a voice input from a user. The voice recognition module is activated when there is no movement for a predetermined time after the gesture is detected. Further, the gesture may different according to an altitude of the portable terminal and/or a direction in which the touch screen included in the portable terminal moves, and the controller 110 may recognize various gestures through the sensor module 170. The controller 110 determines whether the gesture is a movement lowering the touch screen making the altitude of the portable terminal lower through the sensor module 170, and makes a control to recognize or scan the eyeballs of the user, who moves the current portable terminal through at least one camera included in the camera module 150 and activates the voice recognition module. When the eyeballs are not recognized or detected, the controller 110 maintains the voice recognition module in the inactive state. The controller 110 analyzes the voice input through the activated voice recognition module, and determines whether to execute a function corresponding to a result of the analyzed voice based on whether personal information exists or whether the function corresponds to the personal information. The personal information may include private information about a user of the portable terminal, and information reluctant to be provided to other people. For example, the personal information may include a phone book, e-mail, text messages, a call list, a diary, a messenger, a photo album, and the like, and the present disclosure may include various function capable of including personal information, in addition to the aforementioned matters, and the function may be set to provided or not to be provided to others according to selection of a user. Further, the function including no personal information includes various functions, such as Internet search, a call, map search, broadcasts viewing, and news watching. The function including no personal information is a function by which user information is not exposed even though the function is disclosed to an unspecified individual or unspecified individuals, or executed. The function including no personal information may be set to be provided or not to be provided to others according to selection of a user.

Further, the controller 110 executes a function corresponding to the input voice (S616). When the voice is a command for executing a function including no personal information of the portable terminal 100, the controller 110 executes the corresponding function. However, when the voice is a command for executing a function including personal information of the portable terminal 100, the controller 110 does not execute the corresponding function. That is, the controller 110 determines whether the function corresponding to the voice input into the voice recognition module includes the personal information and determines whether to execute the function. Further, when the function desired to be executed by the input voice includes the personal information, the controller 110 outputs a fact that the function corresponding to the voice is not executable.

When the voice is a voice for executing the function including the personal information, the controller 110 may output an execution disallowance to the user, and output the executable function through the touch screen 190. The information may be output by various methods, such as a voice, an alarm sound, a pop-up window, and a display, but the present disclosure is not limited thereto. Further, the controller 110 may display a list, in which one or more functions executable by the voice input are enumerated, on the touch screen 190 through a pop-up window.

Further, when a command is not input for a predetermined time after the execution of the function, the controller 110 switches the executed function to be in an inactive state, and switches the touch screen to be in an inactive state, that is, a sleep mode. The sleep mode is a mode in which power is not applied to the touch screen in order to prevent consumption of battery power.

FIGS. 7A to 7D are views illustrating an example of a process of controlling a function of the portable terminal according to the exemplary embodiment of the present disclosure.

Figure 7A:
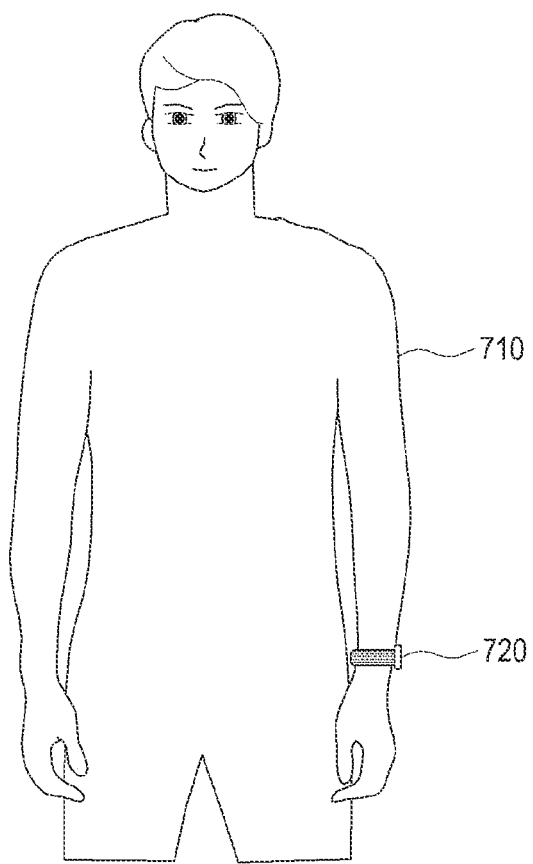
FIG. 7A is a view illustrating an example of a case where a user wears the portable terminal according to the present disclosure on a wrist.
Figure 7B:
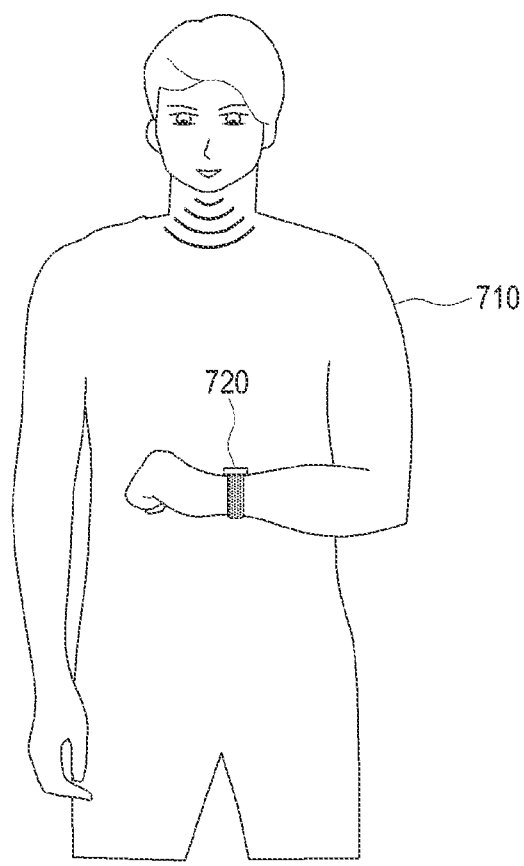
FIG. 7B is a view illustrating an example of a case where a hand wearing the portable terminal according to the present disclosure is bent in a front direction.
Figure 7C:
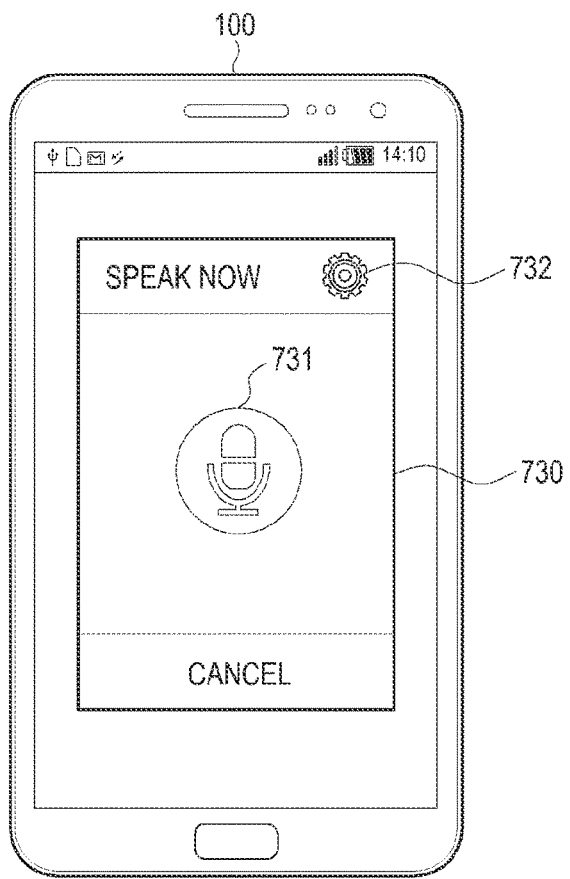
FIG. 7C is a view illustrating an example of a case where the portable terminal according to the exemplary embodiment activates a voice recognition module.
Figure 7D:
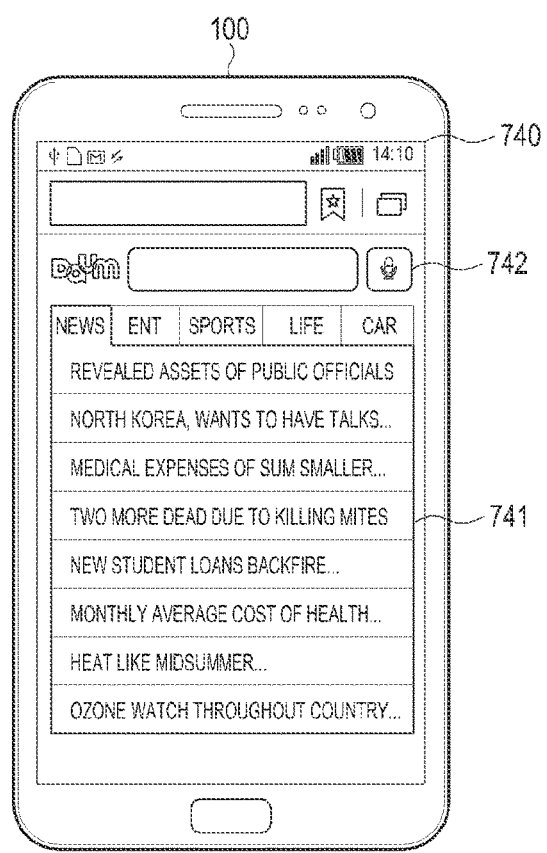
FIG. 7D is a view illustrating an example of a case where a function corresponding to a voice input into the portable terminal according to the exemplary embodiment of the present disclosure is executed.

Referring to FIGS. 7A to 7D, FIG. 7A is a view illustrating an example of a case where a user wears the portable terminal according to the present disclosure on a wrist, FIG. 7B is a view illustrating an example of a case where a hand wearing the portable terminal according to the present disclosure is bent in the front direction, FIG. 7C is a view illustrating an example of a case where the portable terminal according to the exemplary embodiment of the present disclosure activates the voice recognition module, and FIG. 7D is a view illustrating an example of a case where a function corresponding to a voice input into the portable terminal according to the exemplary embodiment of the present disclosure is executed.

Hereinafter, a process of controlling a function of the portable terminal according to the exemplary embodiment of the present disclosure will be described with reference to FIGS. 7A to 7D in detail.

Referring to FIG. 7A, FIG. 7A is a view illustrating an example of a case where a user wears a portable terminal on the wrist, and a user 710 wears an attachable portable terminal 720 on the left hand. The portable terminal 720 may include a belt, a string, and the like so as to be attached to a target, such as an arm or a leg. Further, the user 710 may generally walk or run, and the portable terminal 720 may detect such a movement through the sensor module 170. When the movement is detected as described above, the portable terminal 720 may determine whether the movement is a movement for controlling the operation or the function of the portable terminal 720. As a basis of the determination, the portable terminal 720 may determine whether the movement is a movement for controlling the operation or the function of the portable terminal 720 by storing a moving pattern in daily life and comparing the stored moving pattern with the movement, or through various information, such as a speed, an altitude, an angle, and the like detected by the sensor module 170. Further, when there is no movement for a predetermined time or the portable terminal is in a stop state after the movement is generated, the portable terminal 720 may detect that there is no movement or the portable terminal is in the stop state. For example, when the user 710 bends the arm wearing the portable terminal 720 in the front direction as if the user 710 bends the arm wearing a watch in the front direction when generally seeing the watch, and then stops for a predetermined time or stops the movement, the portable terminal 720 detects such a gesture.

Referring to FIG. 7B, FIG. 7B is a view illustrating an example of a case where a hand wearing the portable terminal is bent in the front direction, and when the user 720 bends a left arm wearing the portable terminal 720 in the front direction, the portable terminal 720 recognizes generation of a movement or a gesture from the state of FIG. 7A to the state of FIG. 7B. In the present embodiment, the gesture of bending the left arm wearing the portable terminal in the front direction is described, but is only the exemplary embodiment, and the present disclosure includes various gestures by which the portable terminal moves. With respect to the various gestures, a different gesture may be mapped according to an attribute of a function desired to be executed through the portable terminal 720. That is, as if the voice recognition module is activated when the user bends the arm wearing the portable terminal 720 in the front direction, when the user wears the portable terminal 720 on an ankle, a module for calculating a step whenever the user walks may be activated. As described above, the present disclosure may execute a predetermined function according to the movement of the portable terminal 720.

Further, the portable terminal 720 drives a timer after the movement to the state of FIG. 7B. Further, when the time calculated by the driven timer exceeds a predetermined time, the portable terminal 720 determines that any command may be input from the user, and activates at least one of the touch screen and the voice recognition module of the portable terminal 720. The touch screen and the voice recognition module may be separately or simultaneously performed, and only one of the touch screen and the voice recognition module may be performed. Further, the portable terminal 720 may recognize or scan the eyeballs of the user 720 through at least one camera included therein. As described above, it is possible to more accurately determine whether to activate the voice recognition module by recognizing or scanning the eyeballs of the user 720. For example, when the time calculated by the driven timer exceeds the predetermined time, but the eyeballs of the user are not recognized or scanned, the portable terminal 720 may not activate at least one of the touch screen and the voice recognition module.

As described above, when the touch screen is activated, a lock screen is displayed according to preference of the user, or when the lock is not set, a basic wallpaper is displayed. When the lock screen is displayed, and then the user releases the lock, the portable terminal 720 enters a standby mode so as to allow the user to use all of the functions providable by the portable terminal 720. In this case, the voice recognition module may be or may not be executed.

Further, when the time calculated by the driven timer exceeds the predetermined time and the voice recognition module is executed, the portable terminal 720 activates the microphone 162 and enters the standby mode for receiving a voice or a sound from the user.

Referring to FIG. 7C, FIG. 7C is a view illustrating an example of a case where the portable terminal according to the exemplary embodiment of the present disclosure activates the voice recognition module, and when the portable terminal 720 desires to receive a voice or a sound input by the user 710, the portable terminal 720 activates the voice recognition module 730, and displays the touch screen. The voice recognition module may receive a neighboring sound and a sound output from a machine medium, as well as a voice vocalized by the user. The voice recognition module may be continuously maintained in the active state until the input of the voice or the sound is stopped, and when the input of the voice or the sound is stopped, the voice recognition module may be switched to be in the inactive state. Further, an environment setting menu 732 is a menu for setting an environment of the voice recognition module 730, and by which sensitivity for recognizing a voice, selection of a language, or functions for blocking abuses or words causing displeasure may be set. Further, a microphone icon 731 indicates a current state of the voice recognition module, and the user may determine whether the voice recognition module is in the active state or the inactive state through the microphone icon 731. When the user requests a specific homepage with a voice through the voice recognition module, the specific homepage is displayed on the touch screen.

Referring to FIG. 7D, FIG. 7D is a view illustrating an example of a case where a function corresponding to a voice input into the portable terminal according to the exemplary embodiment of the present disclosure is executed, and the portable terminal 100 executes a function corresponding to the voice input in FIG. 7C on the touch screen 740. Referring to FIG. 7D, when the voice input in FIG. 7C is "Internet," the portable terminal 100 accesses a homepage (for example, http://www.daum.net) set in a browser accessible to the Internet, and displays a result of the access on the touch screen 740. In cases where the input voice is "Internet," when the user inputs a keyword desired to search through the touch pad or selects the microphone menu 742 to input a keyword desired to search with a voice in a state where the homepage of "Daum (http://www.daum.net)" is displayed on the touch screen 740, the portable terminal 100 outputs a result corresponding to the voice or the keyword input by the user.

Figure 8:
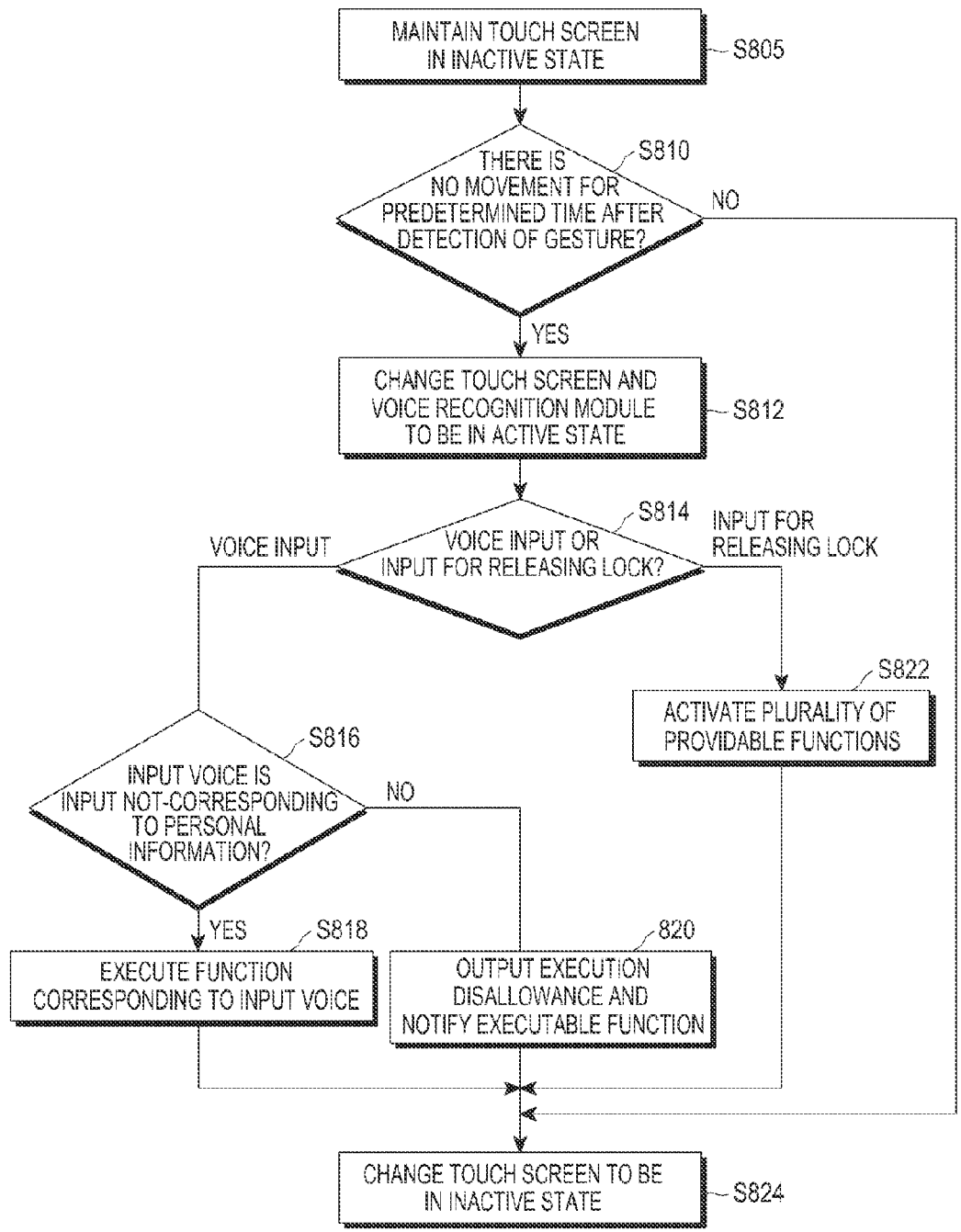
FIG. 8 is a flowchart illustrating a process of controlling a function by using voice recognition in the portable terminal according to the exemplary embodiment of the present disclosure.

FIG. 8 is a flowchart illustrating a process of controlling a function by using voice recognition in the portable terminal according to the exemplary embodiment of the present disclosure.

Hereinafter, a process of controlling a function by using voice recognition in the portable terminal according to the exemplary embodiment of the present disclosure will be described in detail below.

When any command or input is not input during a predetermined time, the touch screen provided at the portable terminal of the present disclosure is maintained in the inactive state, that is, the sleep mode (S805). The inactive state means a state in which the touch screen is turned off.

When there is no movement for a predetermined time after a gesture moving the portable terminal is detected in the inactive state, the controller 110 changes the touch screen and the voice recognition module to be in the active state (S810 and S812). The portable terminal 100 activates at least one of the touch screen and the voice recognition module through a gesture or a movement of the portable terminal detected by the sensor module 170. An order of the activation may be variably adjusted, and the present disclosure may be applicable regardless of the order of the activation. Further, when the gesture is detected, and then there is no movement or a horizontal state of the portable terminal is maintained for the predetermined time, the controller 110 activates the touch screen and activates the voice recognition module for detecting a voice input from a user. The voice recognition module is activated when there is no movement for a predetermined time after the gesture is detected. Further, the gesture may different according to an altitude of the portable terminal and/or a direction in which the touch screen included in the portable terminal heads, and the controller 110 may recognize various gestures through the sensor module 170. The controller 110 determines whether the gesture is a movement lowering the touch screen making the altitude of the portable terminal lower through the sensor module 170, and controls the eyeballs of the user, which move the current portable terminal, to be recognized or scanned through at least one camera included in the camera module 150 and activates the voice recognition module. When the eyeballs are not recognized or detected, the controller 110 maintains the voice recognition module in the inactive state. The controller 110 analyzes the voice input through the activated voice recognition module, and determines whether to execute a function corresponding to a result of the analyzed voice based on whether personal information exists or whether the function corresponds to the personal information.

Further, when the input of the voice or an input for releasing the lock is detected, the controller 110 analyzes the detected input, and when the input is the input of the voice input as a result of the analysis, the controller 110 determines whether the input voice is an input not-corresponding to the personal information (S814 and S816). In operation S812, the portable terminal activates at least one of the touch screen and the voice recognition module. Through the activation, the portable terminal may receive the voice from the user, receive a command for releasing the lock through the activated touch screen, or display the wallpaper through the touch screen when the lock is not set. When a voice for executing a function provided by the portable terminal is input from the user through the activated voice recognition module, the controller 110 analyzes the input voice, and determines whether to execute the function corresponding to the input voice. That is, as a result of the determination, the controller 110 determines whether the function corresponding to the voice includes or corresponds to the personal information.

As a result of the determination of operation S816, when the input voice does not correspond to the personal information, the controller 110 executes the function corresponding to the voice (S818). The controller 110 determines whether the function corresponding to the voice input into the voice recognition module includes the personal information and determines whether to execute the function. That is, when the input voice is a command for executing a function including no personal information of the portable terminal 100, the controller 110 executes the corresponding function. The function is a function including no personal information of the original user of the portable terminal, and includes Internet searches, call communication, map searches, broadcasts viewing, or news articles viewing. However, the present disclosure may include various functions including no the user's personal information, in addition to the aforementioned function. Further, each function may be individually executed, may be interconnected with another function including no personal information, or may not be interconnected with another function including personal information.

As a result of the determination of operation S816, when the input voice corresponding to the personal information, the controller 110 outputs the fact that the function corresponding to the input voice is not executable, and outputs an executable function (S820). When the function corresponding to the input voice includes the personal information, the controller 110 does not execute the function corresponding to the input voice. When the function desired to be executed by the input voice includes the personal information, the controller 110 outputs a fact that the function corresponding to the voice is not executable. The fact that the function corresponding to the voice is not executable may be output by various methods, such as a voice, a sound, and an alarm sound, which the user may recognize, but the present disclosure is not limited thereto. Further, the controller 110 outputs a list indicating one or more functions executable by the voice input through a pop-up window. The controller 110 may display a list, in which one or more functions executable by the voice input are enumerated, on the touch screen 190 through a pop-up window. Further, when a command is not input for a predetermined time after the execution of the function, the controller 110 switches the executed function to be in an inactive state, and switches the touch screen to be in a sleep mode. The sleep mode is a mode in which power is not applied to the touch screen in order to prevent consumption of battery power.

Further, as a result of the analysis of operation S814, when the input is an input for releasing the lock, the controller 110 activates a plurality of functions provided by the portable terminal (S822). When the controller 110 compares the input for releasing the lock and a predetermined lock, and the input for releasing the lock corresponds to the predetermined lock, the controller 110 activates the plurality of functions provided by the portable terminal 100.

When any command or input is not input for a predetermined time after the performance of operations S818, S820, and S822, the controller 110 switches the touch screen to be in the inactive state, that is, the sleep mode (S824). The inactive state or the sleep mode is a mode in which power is not applied to the touch screen in order to prevent consumption of battery power of the portable terminal.

Figure 9A:
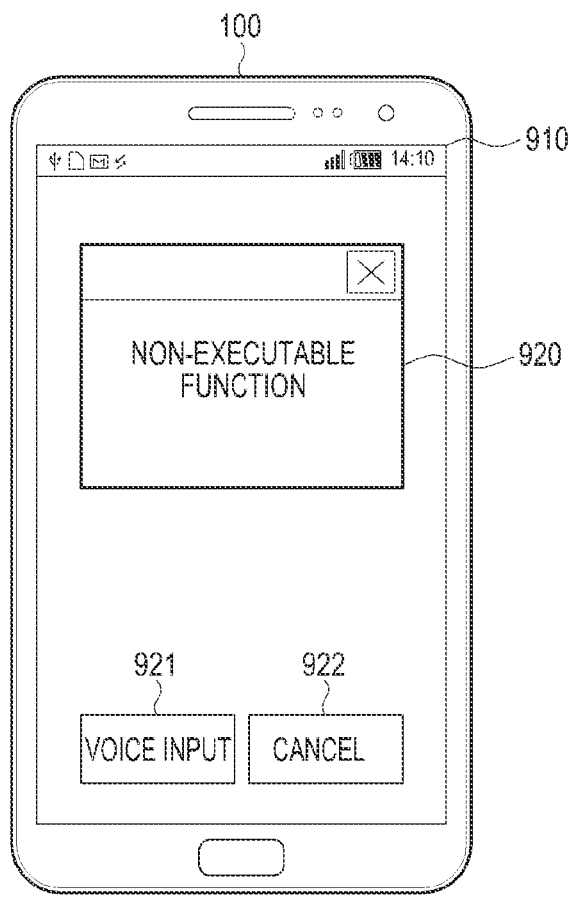
FIG. 9A is a view illustrating an example of the output of a case where a function corresponding to a voice input into the portable terminal according to the exemplary embodiment of the present disclosure is not executable.
Figure 9B:
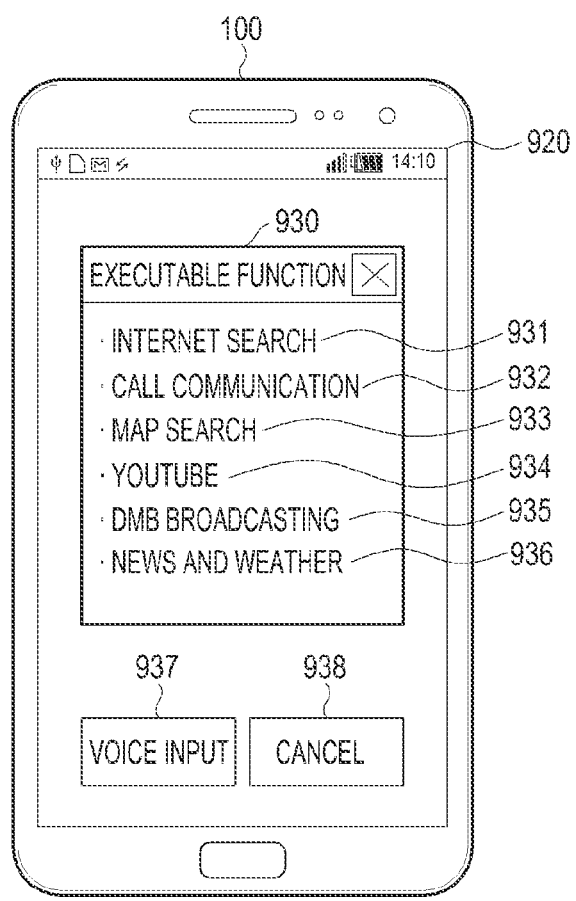
FIG. 9B is a view illustrating an example of a case where a list of functions executable in response to a voice input into the portable terminal according to the exemplary embodiment of the present disclosure is displayed.

FIGS. 9A and 9B are views illustrating an example of the output of a case where a function corresponding to a voice input into the portable terminal according to the exemplary embodiment of the present disclosure is not executable.

Referring to FIGS. 9A and 9B, FIG. 9A is a view illustrating an example of the output of a case where a function corresponding to a voice input into the portable terminal according to the exemplary embodiment of the present disclosure is not executable, and FIG. 9B is a view illustrating an example of a case where a list of functions executable in response to a voice input into the portable terminal according to the exemplary embodiment of the present disclosure is displayed.

Referring to FIG. 9A, FIG. 9A is a view illustrating an example of the output of a case where a function corresponding to a voice input into the portable terminal according to the exemplary embodiment of the present disclosure is not executable, and the controller 110 detects a gesture of the portable terminal 100, and then analyzes a voice input through the activated voice recognition module. As a result of the analysis, when the function corresponding to the input voice is a function including no personal information, the controller 110 executes the function. However, when the function corresponding to the input voice is a function including personal information, the controller 110 does not execute the function. Further, the controller 110 outputs a notice notifying that the function is not executable so as to allow the user to recognize the fact. A touch screen 910 of FIG. 9A displays a pop-up window 920. The pop-up window 920 is a pop-up window for notifying that the function corresponding to the input voice includes personal information and is not executable. Further, the touch screen 910 may include and display a voice input menu item 921 for receiving a voice for executing another function, and a cancel menu item 922 for stopping the pop-up window or cancelling the execution of the function by the voice input, in addition to the pop-up window 920. When the user selects the voice input menu item 921, the controller 110 may activate the voice recognition module, which may be temporarily stopped, again.

Referring to FIG. 9B, FIG. 9B is a view illustrating an example of a case where a list of functions executable in response to a voice input into the portable terminal according to the exemplary embodiment of the present disclosure is displayed, the controller 110 displays the pop-up window 920 notifying that the function corresponding to the input voice is not executable as illustrated in FIG. 9A, and displays a pop-up window 930 indicating a list including one or more functions executable by the portable terminal 100. The pop-up window 930 includes Internet search 931, call communication 932, map search 933, YouTube search 934, DMB broadcasting 935, and news and weather 936. Further, the pop-up window 930 may include various functions including no the user's personal information, in addition to the aforementioned function, and the present disclosure is not limited thereto. Further, the touch screen 920 may include and display a voice input menu item 937 for receiving a voice for executing another function, or receiving one or more functions displayed on the pop-up window 930, and a cancel menu item 938 for stopping the pop-up window or cancelling the execution of the function by the voice input, in addition to the pop-up window 930. When the user selects the voice input menu item 937, the controller 110 may activate the voice recognition module, which may be temporarily stopped, again, and displays the activated voice recognition module on the touch screen 920.

It may be appreciated that the embodiments of the present disclosure may be implemented in software, hardware, or a combination thereof. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It will be appreciated that a memory, which may be incorporated in a portable terminal, may be an example of a machine-readable storage medium which is suitable for storing a program or programs including commands to implement the exemplary embodiments of the present disclosure. Accordingly, the present disclosure includes a program that includes a code for implementing an apparatus or a method defined in any claim in the present specification and a machine-readable storage medium that stores such a program. Further, the program may be electronically transferred by a predetermined medium such as a communication signal transferred through a wired or wireless connection, and the present disclosure appropriately includes equivalents of the program.

Moreover, the above-described mobile terminal can receive the program from a program providing device which is connected thereto in a wired or wireless manner, and store the program. The program providing device may include a program including instructions for controlling the functions of the portable terminal, a memory for storing information required for the function control method, a communication unit for performing wired or wireless communication with the portable terminal, and a controller that transmits a corresponding program to the host device at the request of the portable terminal or automatically.

Meanwhile, while the disclosure has been shown and described with reference to specific embodiments thereof in the detailed description of the present disclosure, it goes without saying that various changes in form and details may be made therein without departing from the spirit and scope of the disclosure. Therefore, the scope of the present disclosure should not be defined as being limited to the embodiments, but should be defined by the appended claims and equivalents thereof.

What is claimed is:

1. A method of controlling a function of a wearable electronic device, comprising:
   detecting a predetermined gesture by a motion sensor of the wearable electronic device, for activating a voice recognition function of the wearable electronic device, wherein the wearable electronic device is worn on a wrist of a user;
   driving a timer for calculating a time period from an instance when the predetermined gesture is detected;
   recognizing eyeballs of the user through one or more cameras of the wearable electronic device;
   activating a touch screen and the voice recognition function when the time period calculated by the driven timer exceeds a predetermined time period and the eyeballs of the user are recognized;
   displaying, on the touch screen, a screen of the activated voice recognition function for receiving a voice input to control the voice recognition function of the wearable device;
   receiving the voice input through the activated voice recognition function;
   determining whether one or more functions executable by the received voice input include a user's personal information of the wearable electronic device;
   if the one or more functions executable based on the voice input do not include the user's personal information, analyzing the voice input by using the activated voice recognition function, and executing a function that does not include the user's personal information, based on the voice input; and
   if the one or more functions executable based on the voice input include the user's personal information of the wearable electronic device, outputting, through the activated touch screen, a message indicating that the one or more functions including the user's personal information are not executable,
   wherein the output message includes a function list of one or more functions that are executable by at least one voice input different from the received voice input and do not include the user's personal information.

2. The method of claim 1, wherein the predetermined gesture is a movement raising the touch screen of the wearable electronic device making an altitude of the wearable electronic device higher.

3. The method of claim 1, wherein the executed function which does not include the user's personal information includes one of Internet searches, call communication, map searches, broadcasts viewing, or news and weather information viewing, and is not interconnected with another function.

4. The method of claim 1, wherein the one or more functions executable based on the voice input which include the user's personal information includes a phonebook search function, e-mails, text messages, a call list, a diary, a messenger, and a photo album, and is preset by the user.

5. The method of claim 1, further comprising:
   if a command is not input for a predetermined time after the voice recognition function is executed, switching the executed function to be in an inactive state.

6. The method of claim 1, further comprising, if the one or more functions executable based on the voice input include the user's personal information, outputting a voice notifying that a function corresponding to the voice input is not executable.

7. The method of claim 1, further comprising outputting the function list with a voice.

8. A wearable electronic device for controlling a function by using voice recognition, comprising:
   a touch screen;
   a sensor; and
   a processor configured to:
   control the sensor to detect a predetermined gesture for activating a voice recognition function of the wearable device, wherein the wearable electronic device is worn on a wrist of a user,
   drive a timer for calculating a time period from an instance when the predetermined gesture is detected,
   recognize eyeballs of the user through one or more cameras of the wearable electronic device,
   activate the touch screen and the voice recognition function when the time period calculated by the driven timer exceeds a predetermined time period and the eyeballs of the user are recognized,
   control the touch screen to display a screen of the activated voice recognition function for receiving a voice input to control the voice recognition function of the wearable electronic device,
   receive the voice input through the activated voice recognition function,
   determine whether one or more functions executable by the received voice input include a user's personal information of the wearable electronic device,
   if the one or more functions executable based on the voice input do not include the user's personal information, analyze the voice input by using the activated voice recognition function, and execute a function that does not include the user's personal information, based on the voice input, and
   if the one or more functions executable based on the voice input include the user's personal information of the wearable electronic device, output, through the activated touch screen, a message indicating that the one or more functions including the user's personal information are not executable, wherein the output message includes a function list of one or more functions that are executable by at least one voice input different from the received voice input and do not include the user's personal information.

9. The wearable electronic device of claim 8, wherein the sensor is further configured to detect whether the predetermined gesture is a movement raising the touch screen of the wearable electronic device making an altitude of the wearable electronic device higher.

10. The wearable electronic device of claim 8, further comprising a camera module including the one or more cameras configured to recognize the eyeballs of the user moving the wearable electronic device.

11. The wearable electronic device of claim 8, wherein the processor is further configured to activate a microphone configured to receive the voice input, if the wearable electronic device is maintained in a horizontal state for a predetermined time after the predetermined gesture is detected.

12. The wearable electronic device of claim 8, wherein the processor is further configured to determine whether a function corresponding to the voice input includes personal information of the user of the wearable electronic device and to determine whether to execute the voice recognition function.

13. The wearable electronic device of claim 8, wherein the processor is further configured to switch the executed function to be in an inactive state, if a command is not input for a predetermined time after the execution of the voice recognition function.

* * * * *